Aug. 26, 1958 L. RADO 2,848,854
PROCESS FOR THE PRODUCTION OF CONTAINERS FILLED WITH LIQUIDS
OR PASTES FROM A PLIABLE NON-METALLIC MATERIAL OF
THERMOPLASTIC NATURE
Filed Oct. 1, 1953 2 Sheets-Sheet 1
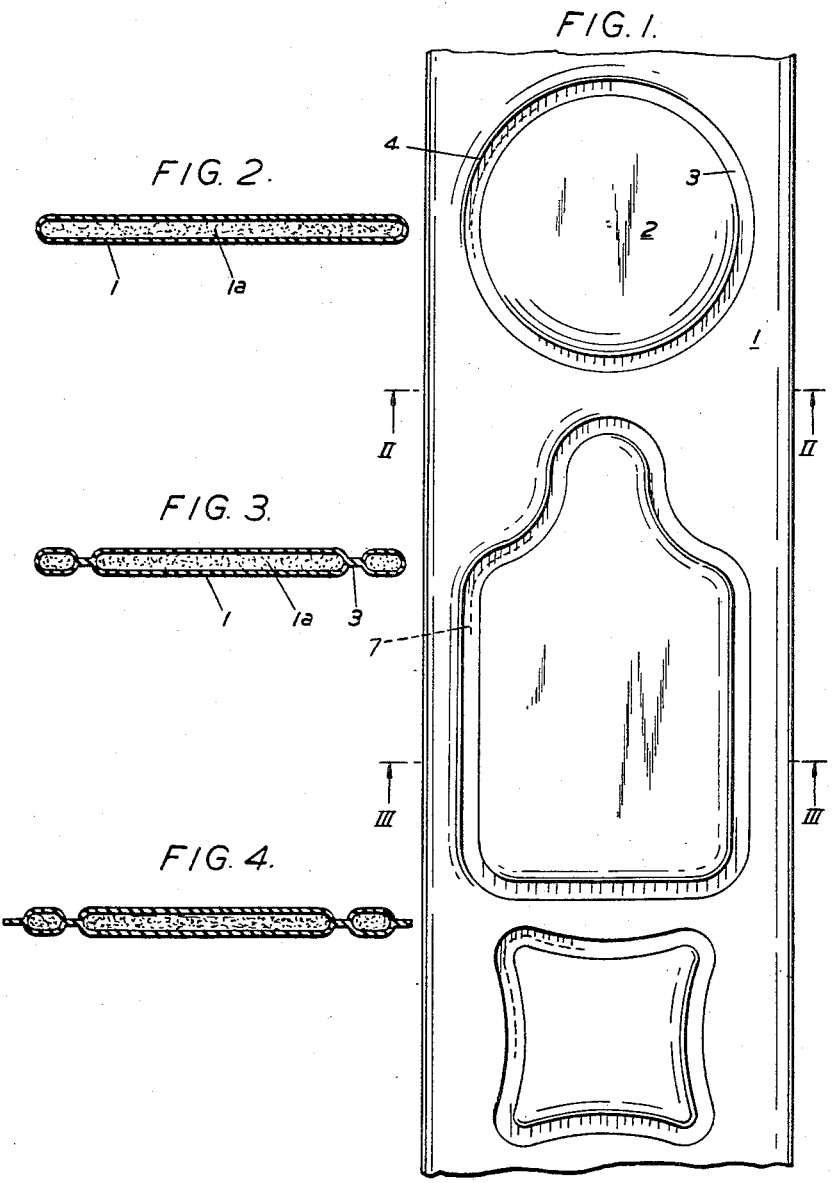
Inventor
LEOPOLD RADO
By
Wilkinson Mawhinney
Attorneys

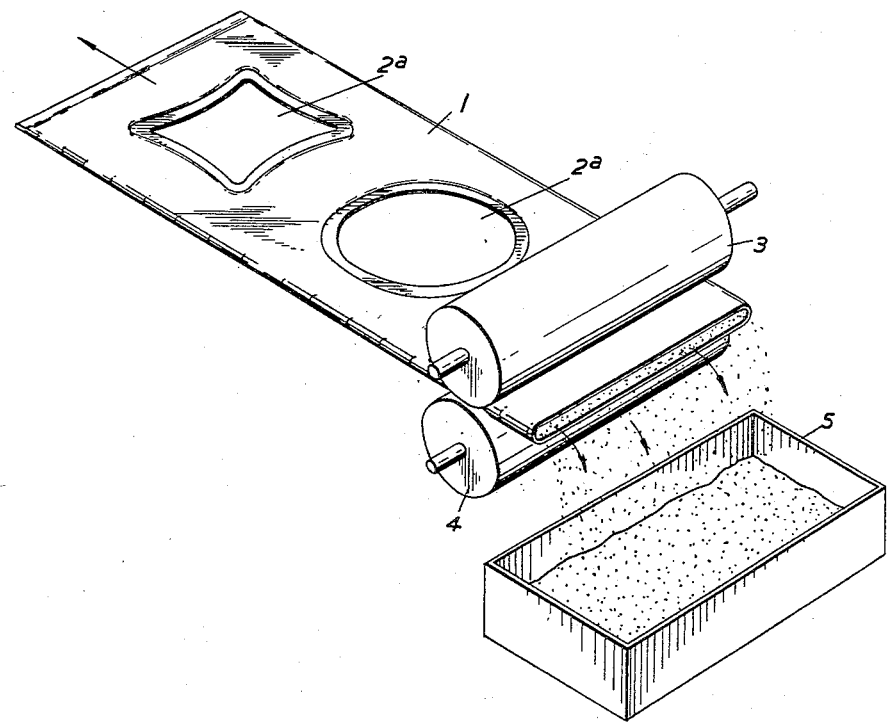

United States Patent Office 2,848,854
Patented Aug. 26, 1958

2,848,854

PROCESS FOR THE PRODUCTION OF CONTAINERS FILLED WITH LIQUIDS OR PASTES FROM A PLIABLE NON-METALLIC MATERIAL OF THERMOPLASTIC NATURE

Leopold Rado, London, England; Dorothy Frances Pickering executrix of said Leopold Rado, deceased Application October 1, 1953, Serial No. 383,633

Claims priority, application Great Britain October 2, 1952

2 Claims. (Cl. 53—37)

The subject of the present invention is an improvement in the process described in the applicant's Patent No. 2,530,400 of November 21, 1950.

My Patent No. 2,530,400 describes and claims a process for the production of containers filled with liquids or pastes from a pliable non-metallic material of thermoplastic nature for example vinyl resin and, in particular polyvinyl chloride or the like, in which process a length of tubing adapted to provide a number of containers is filled, whereafter pressure is applied by a tool or a pair of opposed tools laterally to the tubing walls at distances apart equal to the length of a single container to cause the contents to be displaced from the places where the pressure is applied so that the walls of the tubing make contact with each other thereat, after which, and whilst the pressure is maintained, heat is applied thereto by the said pressure applying tool or pair of tools to weld the contacting walls together whereby a tube-like container sealed at both ends is produced which is separated from the remaining part of the tubing by cutting along the centre of the width of the welded place so that the severed end of the length of tubing is also sealed.

The present invention is a modification of the process described in my main Patent No. 2,530,400 and gives the opportunity for the production of fluid-filled containers of different shapes, and also and at the same time the recovery of the surplus fluid and the thermoplastic material unused in the production of the filled containers.

In accordance with the invention, a larger container preferably in tubing form and provided for a number of smaller containers to be produced therefrom, is filled with a fluid substance exceeding in quantity that required for an individual container, and by a pair of opposed tools preferably each of them having a cavity shaped in accordance with the shape of the container to be produced therewith, pressure is applied to the walls of the filled large container to displace the contents thereat and to cause the walls at the pressure places to contact each other and so to surround and enclose a quantity of fluid substance contained between the walls of the said large container thereby filling out the cavities in the presser tools, and after the contents have been displaced from the pressure places surrounding the fluid content, heat is generated by the said presser tools to weld the contacting walls together, whereafter the so-produced individual container is separated by cutting along the middle of the width of the welded surround. The tubing used can be either an extruded tubing or tubing produced from two superposed strips by welding the lengthwise edges thereof. The opposed tools provided with the shaped cavities are narrower in width than that of the filled tubing on which they apply pressure to bring the walls thereof into contact with each other and to displace the content thereat, thereby surrounding and enclosing a quantity of the content, whereafter the said tools generate the heat to weld the contacting walls together at the said pressure places.

To carry out the welding in the production of the containers, radio frequency heating should preferably be used, but other types of heating can also be used provided that the heat is generated and applied to the contacting walls after the contents have been displaced from the pressure places.

The accompanying drawing illustrates the process schematically: Fig. 1 shows a thermoplastic tubing 1, filled with liquids or pastes, and from said tubing packages are produced of different shapes marked 2, 2a and 2b, by a pair of opposed welding tools, which tools have the shape of the package which it is intended they shall form.

The welded areas 3, 3a and 3b surrounding the contents packed will be stamped out by a cutting tool the cutting edge of which tool follows, in the present case the line 4, or 4a or 4b, according to the shape of the package, which line is approximately in the middle of the width of the welding.

Fig. 2 shows a sectional view 11—11 of the filled tubing of Fig. 1, which tubing is marked 1 and the contents thereof 1a.

Fig. 3 shows in sectional view 111—111 the filled tubing of Fig. 1 whereby 1 marks the tubing, 1a the contents thereof, and 3a the welded area. The tubing of Fig. 1 is an extruded seamless tubing. Naturally the tubing can also be produced from two superimposed strips whereby the lengthwise edges of the strips are welded together to produce the tubing. On using such tubing it will be filled with fluid substance as in the case of seamless tubing and the same type of packages can be produced therefrom as from seamless tubing.

Fig. 4 shows in sectional view a tubing made from two superimposed strips the lengthwise edges 3d of which are welded, and from such tubing is formed a package as shown in Fig. 3.

When the packages are stamped out from the filled tubing there will remain a length of tubing the fillings of which communicate with each other, and if the content is liquid this can be emptied and the contents reclaimed for re-use; the tubing can also be re-extruded or calendered for the production of packaging material.

Fig. 5 shows the process whereby, in particular, pasty substances comprise the package contents. The places in the tubing 1 from which the filled and shaped packages have been stamped out are marked 6a. The tubing 1 left after the packages have been stamped out therefrom is brought between a pair of rollers 7 and 8, and by moving the tubing in the direction of the arrow, the contents are pressed out by the rollers and collected in the receptacle 5.

What I claim is:

1. The method for the production of containers filled with fluid substance from a pliable tubing of non-metallic material of at least in part thermoplastic nature, whereby the containers to be produced therefrom are less in width than the width of the tubing, and whereby the excess fluid is removed from between the containers and from the margins of the tube, comprising the steps of providing a large container made from the said tubing from which a number of smaller containers are to be produced, introducing the fluid substance into the large container in excess of the quantity required for an individual smaller container, subjecting the tubing to pressure between a pair of opposed tools having cavities of the shape of the smaller containers to be produced therewith, the pressing portions of said tools being of lesser width than the width of the filled tubing, thereby filling out the cavities and displacing the fluid at the pressure places, bringing the walls of the tubing into contacting engagement with each other, leaving an excess of fluid in the space between the smaller container defined by the said tools and the edges of the said large container and between the successive smaller containers so formed, generating heat by the presser tools to weld the contacting walls together to surround the said cavities, repeating the steps of pressing and welding, separating the so produced individual containers from the large container by cutting along the middle of the width of the welded surround of the cavities, and subsequently moving the waste tubing material thus formed in the longitudinal direction of the axis of the tubing and subjecting intercommunicating channels thereof containing the surplus fluid to a pinching action without puncturing the tubing walls to expel the surplus fluid to be reclaimed from the open end of the said tubing.

2. Method for the production of containers in accordance with claim 1, wherein at least two pairs of tools having cavities of different shapes and volumes successively in alternation produce the smaller individual containers.

References Cited in the file of this patent

UNITED STATES PATENTS

| | | |
|---|---|---|
| 700,806 | Paine | May 27, 1902 |
| 2,323,582 | Weckesser | July 6, 1943 |
| 2,358,246 | Nicolle | Sept. 12, 1944 |
| 2,469,975 | McCloy | May 10, 1949 |
| 2,530,400 | Rado | Nov. 21, 1950 |
| 2,566,533 | Poux | Sept. 4, 1951 |

FOREIGN PATENTS

| | | |
|---|---|---|
| 622,106 | Great Britain | Apr. 27, 1949 |